United States Patent [19]

Sawayama et al.

[11] 4,258,565
[45] Mar. 31, 1981

[54] FORCE DETECTOR

[75] Inventors: Takehiro Sawayama; Ichizo Ito; Toshio Aga; Tetsuo Ando, all of Musashino, Japan

[73] Assignee: Yokogawa Electric Works, Ltd., Tokyo, Japan

[21] Appl. No.: 53,214

[22] Filed: Jun. 29, 1979

Related U.S. Application Data

[62] Division of Ser. No. 910,637, May 30, 1978, abandoned.

[30] Foreign Application Priority Data

| May 30, 1977 [JP] | Japan | 52-63122 |
| Jun. 1, 1977 [JP] | Japan | 52-64478 |
| Jun. 1, 1977 [JP] | Japan | 52-71435[U] |

[51] Int. Cl.³ .................................................. G01L 1/16
[52] U.S. Cl. .............................. 73/141 R; 73/DIG. 4; 310/338
[58] Field of Search ................ 73/DIG. 4, 141 R, 654, 73/703, 727, 768, 753, 754, 194 VS; 310/328, 338

[56] References Cited

U.S. PATENT DOCUMENTS

| 3,031,591 | 4/1962 | Cary et al. | 310/338 |
| 3,239,696 | 3/1966 | Burkhalter et al. | 73/DIG. 4 |
| 3,341,797 | 9/1967 | Watson | 338/47 |
| 3,365,689 | 1/1968 | Kutsay | 73/141 A |
| 3,717,039 | 2/1973 | Zinker | 73/753 |
| 4,127,788 | 11/1978 | Daugherty | 310/338 X |

FOREIGN PATENT DOCUMENTS 198797  8/1967  U.S.S.R. ................... 310/338

Primary Examiner—Charles A. Ruehl
Attorney, Agent, or Firm—Parmelee, Johnson, Bollinger & Bramblett

[57] ABSTRACT

A force detector for detecting a force directly as a stress is disclosed which includes a piezoelectric unit for detecting a stress, a vessel for housing the piezoelectric unit, and a seal member for sealing the piezoelectric unit firmly and integrally in the vessel.

3 Claims, 10 Drawing Figures

FORCE DETECTOR

This is a division of application Ser. No. 910,637 filed May 30, 1978, now abandoned.

BACKGROUND OF THE INVENTION

The present invention relates to a force detector designed for detection of a stress, and more particularly to a detector for converting a force into an electric signal by the use of a piezoelectric element.

In general, force is classified broadly as either dynamic or static. Instruments known for measuring dynamic force include vibrometer, accelerometer, wave-height meter, shock tester, vortex flowmeter and gyro, while those for measuring static force include manometer, differential pressure gauge and load cell (scale). The force detector according to the present invention is suited to serve as a sensor for use in such measuring instruments.

FIG. 1 shows the structure of a conventional pressure sensor equipped with a piezoelectric element as used heretofore. In the drawing, labeled as 1 is a vessel consisting of a cylindrical part 11, a pressure receiving plate 12 and a bottom plate 13. The pressure receiving plate is shaped into a flexible thin disk with its circumferential end being fixed to the cylindrical part 11, and receives a pressure to be measured. Labeled as 2 is a disk-like piezoelectric unit of which the surface a is bonded to the pressure receiving plate 12 with a bonding agent. When a pressure P to be measured is applied in the above structure, the pressure receiving plate 12 is bent to exert a force on the piezoelectric unit 2 in the direction indicated by an arrow X, so that an electric output corresponding to the flexure of the pressure receiving plate 12 is obtained from the piezoelectric unit 2. To enhance the sensitivity in such a device, it is necessary to widen the pressure receiving plate 12 to increase the quantity of flexure. However, a sensor of intrinsically stout construction is not attainable.

FIG. 2 shows another example of a conventional pressure sensor (disclosed in the Japanese utility Model No. 945397). In this example, a set screw 131 composed of an electric insulator is provided on a bottom plate 13 of a vessel 1, and a piezoelectric unit 2 is supported with a setting pressure applied in the direction indicated by an arrow Y. In this structure, a pressure P to be measured is receivable directly as a force exerted in the same direction since the piezoelectric unit 2 is supported by the set screw 131. However, such supporting by the set screw 131 also brings about a disadvantage that the electric output characteristic of the piezoelectric unit 2 changes widely depending on variation in the support point condition or looseness of the set screw.

In the foregoing examples, a bonding agent composed of, for instance, epoxide resin is used between the joint surfaces a of the pressure receiving plate 12 and the piezoelectric unit 2, but such a bonding agent is not suitable in case the sensor is operated in a high-temperature atmosphere. Moreover, in order to achieve transmission of force, it is necessary that the joint surfaces a of pressure receiving plate 12 and piezoelectric unit 2 are kept in intimate contact with each other. For high temperature use, generally the piezoelectric unit 2 is brazed to the pressure receiving plate 12. In this case, since it is impossible to adopt direct brazing of the piezolectric element, the process is carried out by first forming a platinum layer, which also serves as an electrode, on the joint surface of the piezoelectric unit 2 and then joining it firmly to the pressure receiving plate 12 while utilizing the platinum layer. For the reason that formation of a platinum layer by the art of evaporation is difficult due to inertness of platinum, sputtering is usually adopted to form a platinum layer on the joint surface of the piezoelectric unit 2, hence complicating the operation with resultant increase of production cost. Furthermore, as electric insulation is not attainable between the platinum layer and the pressure receiving plate 12, there exists another disadvantage that a step for ensuring insulation becomes necessary in case such insulation is required.

SUMMARY OF THE INVENTION

It is an object of the present invention to provide a force detector which detects a force with high sensitivity by the use of a piezoelectric element and produces an electric output signal.

Another object of the invention is to provide a compact force detector formed into a simplified structure.

And a further object of the invention is to provide a force detector having stable characteristics.

DESCRIPTION OF THE PREFERRED EMBODIMENTS

Figure 1:
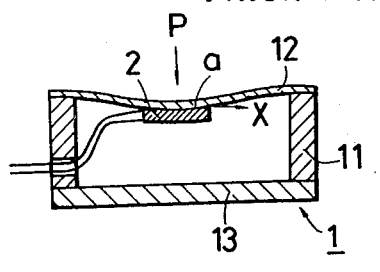
FIGS. 1 and 2 show the structures of conventional examples.
Figure 2:
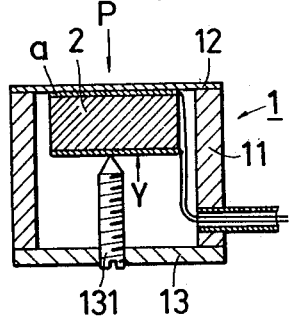
Figure 3:
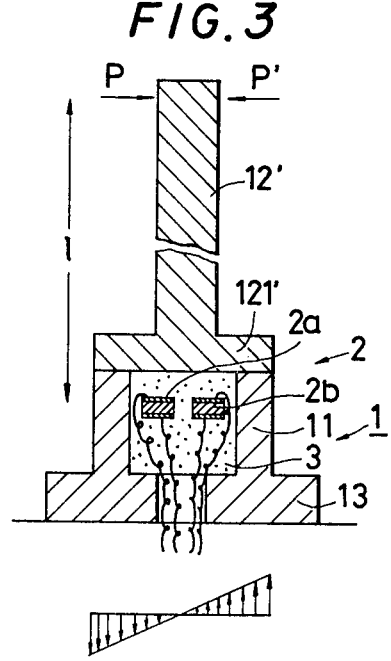
FIG. 3 illustrates the structure of an embodiment according to the present invention.

FIG. 3 illustrates the structure of an exemplary embodiment according to the present invention, in which the same reference numerals and symbols as those in FIGS. 1 and 2 denote equivalents to perform the same functions. Hereinafter an explanation will be given only on the components different from FIGS. 1 and 2. Labeled as 12' is a columnar pressure receiving member with a flange 121' connected to a cylindrical part 11, and 2 is a piezoelectric unit shaped into a disk and disposed in a vessel 1. In this example, two piezoelectric units are positioned opposite to each other through the center axis of the pressure receiving number 12', and each unit is equipped with a piezoelectric element composed of lithium niobate ($LiNbO_3$). A seal member 3 is composed of an insulating material such as glass and serves to seal the piezoelectric unit 2 in the vessel while electrically insulating the unit 2 therefrom. In this structure, when a pressure P to be measured is applied to the pressure receiving member 12' as shown in FIG. 3, the pressure is transmitted to the piezoelectric unit 2 through the seal member 3. Then, stresses of mutually opposite directions are exerted on both sides of the center axis of the pressure receiving member 12', thereby causing the piezoelectric units 2a, 2b to produce electric signals proportional to the stresses. And the electric signals thus generated are processed by an electric circuit of a high input impedance to detect the pressure P. In this embodiment, a double electric signal can be obtained by differentially processing the outputs of the piezoelectric units 2a, 2b.

Furthermore, for the reason that the pressure P is applied to the piezoelectric unit 2 after being intensified in accordance with the length l based on the pressure receiving member 12', high-sensitivity detection is attainable in the piezoelectric unit 2. And it is also possible to install the vessel at a position spaced apart from the measuring location by lengthening the body of the pressure receiving member 12', hence allowing measurement even in a high-temperature atmosphere.

Figure 4:
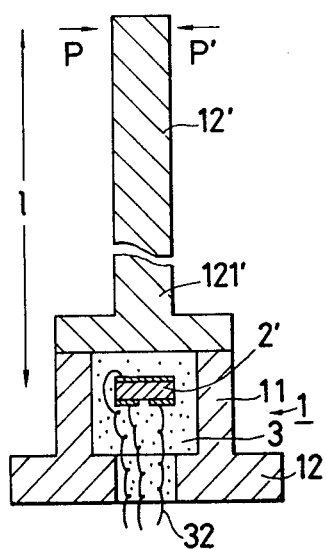
FIGS. 4 through 10 illustrate other embodiments of the invention.
Figure 5:
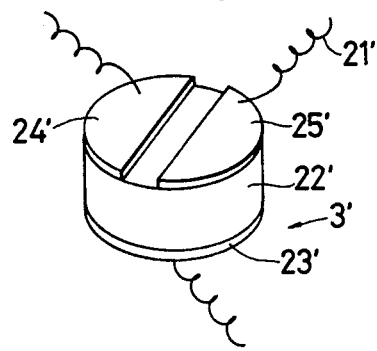
Figure 6A:
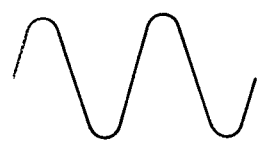
Figure 6B:
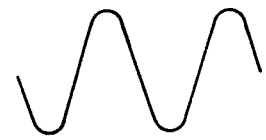
Figure 6C:
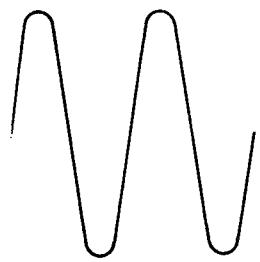

FIG. 4 illustrates the structure of another embodiment according to the present invention, and FIG. 5 shows principal portions of FIG. 4, in which 2' is a piezoelectric unit shaped into a disk whose center is positioned on the center axis of the pressure receiving member 12'. The piezoelectric unit 2' consists of lead wires 21', a disk-like piezoelectric element 22' and electrodes 23', 24', 25'. The electrode 23' is shaped into a thin disk and is located on one surface of the piezoelectric element 22', while the electrodes 24', 25' are shaped to be arcuate substantially and are located on the other surface of the element 22' symmetrically with respect to the center of the element 22'. In this structure, a signal detected between the electrodes 23' and 24' is opposite in phase to a signal detected between the electrodes 23' and 25' as plotted in FIGS. 6 (A) and 6 (B), and the output produced therefrom differentially becomes double as plotted in FIG. 6 (C) in comparison with FIGS. 6 (A) and 6 (B). Since merely a single detecting element is required, a cost reduction is achievable with a smaller space needed to provide a compact construction.

Figure 7A:
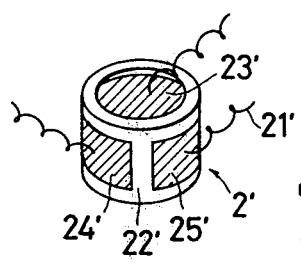
Figure 7B:
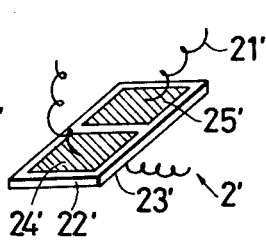
Figure 7C:
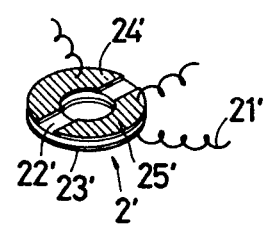

The piezoelectric unit 2' of FIG. 5 may be cylindrical as in FIG. 7 (A) or rectangular as in FIG. 7 (B), or may be shaped like a doughnut disk as in FIG. 7 (C).

Figure 8:
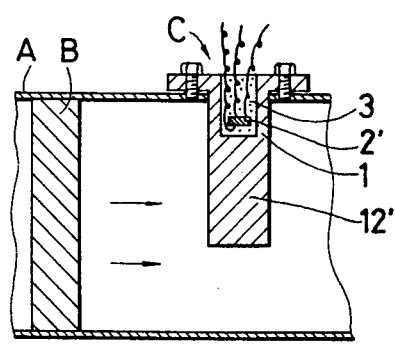

FIG. 8 illustrates how the present invention is applied to a flow metering apparatus utilizing Karman's vortices. In this drawing: A is a duct in which a fluid to be measured flows; B is a pillar-shaped vortex generator inserted at right angles with the duct A; and C is a force detector of this invention. In a conventional apparatus of this type, a pressure receiving plate or a vibrating plate fixed at one end thereof is bent by the pressure of vortices flowing downstream with respect to the vortex generator, and such bending is detected by means of a strain gauge attached in the vicinity of the fixed portion. According to this apparatus, however, it is necessary to increase the strain for attaining a high detection sensitivity while reducing the rigidity of a strain-gauge mounting region, hence bringing about difficulty in obtaining an intrinsically solid construction.

In the embodiments of FIGS. 3 and 4, the pressure applied to the pressure receiving member 12' is detected directly as a stress through the seal member 3 by the piezoelectric unit 2' sealed fixedly in the vessel 1 which is located in the vicinity of a stationary portion to the duct A. In this case, a high detection sensitivity can be ensured since the pressure to be measured is detected after being intensified in accordance with the length l of the pressure receiving member 12' in the diametral direction of the duct A. And therefore it becomes possible to render the present structure solid. Furthermore, the natural vibration frequency can be raised to accomplish high-sensitivity detection of a flow velocity or quantity in a wide range.

Although the cylindrical part 11 and the pressure receiving member 12' are formed separately in the foregoing embodiments, it is obvious that they can be integrated. Moreover, instead of two piezoelectric units 2, a single unit may be disposed on one side of the center axis of the pressure receiving member 12'. Furthermore, if the electrode 23' of piezoelectric unit 2' is divided into two arcuate electrodes correspondingly to the electrodes 24' and 25', the output of piezoelectric unit 2' can be doubled by connecting the arcuate electrodes in series when produced in the form of voltage or in parallel when produced in the form of electric charge.

Connection of the electrodes may be effected on the surface of the piezoelectric unit 2', but a further convenience is offered by drawing out four lead wires from each electrode so that series or parallel connection is rendered selectable as required.

Figure 9A:
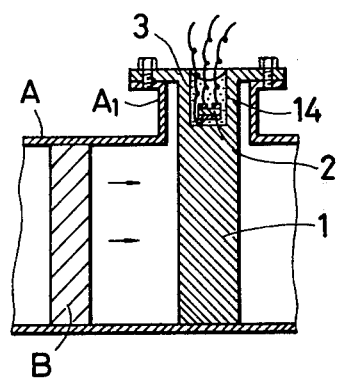
Figure 9B:
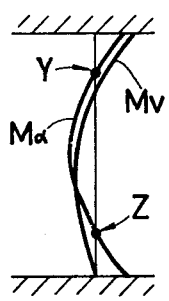
Figure 9C:
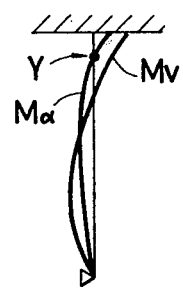

FIGS. 9 (A), 9 (B) and 9 (C) illustrate the structure of another embodiment according to the present invention, in which FIG. 9 (A) is a diagram of the structure, and FIG. 9 (B) and FIG. 9 (C) schematically plot bending moments in an example used for a sensor in a vortex flowmeter. In the drawing: 1 is a pillar-shaped vessel; 14 is a recess formed on the top of the vessel 1; 2 is a piezoelectric unit shaped into a disk and disposed in the recess 14 with its center being aligned with the center axis of vessel 1; and 3 is a seal member composed of an insulating material (glass in this example) and serving to seal the piezoelectric unit 2 in the vessel 1. One end of the vessel 1 with the recess 14 is fixed to a protrusion A1 of the duct A, while the other end thereof is fixed to the duct A. Labeled as B is a vortex generator provided in the duct A.

When a fluid to be measured flows in the duct A, Karman's vortices are generated by the vortex generator B, and the vessel 1 receives an alternating force X exerted due to the Karman's vortices in the direction perpendicular to the plane of the drawing paper, so that the vortex generation frequency can be detected by the piezoelectric unit 2.

In the meanwhile, the entire duct is vibrated by the vibratory noise propagating through the duct from a pump, a compressor or switching of a damper. Such vibration causes an alternating bending moment $M\alpha$ based on the mass distribution of the vessel 1 in the direction where the said alternating force X is exerted. And the stress generated in the vessel 1 by the alternating bending moment $M\alpha$ is detected as noise in the piezoelectric unit 2.

FIG. 9 (B) shows the bending moment $M\alpha$ as viewed from the direction of flow, in which MV represents the alternating bending moment caused by generation of vortex. In this embodiment, the piezoelectric unit 2 is located at a position Y where the bending moment $M\alpha$ becomes zero, and it is spaced apart by 0.2 l to 0.3 l on the basis of the distance l between the stationary ends of vessel 1. Consequently, the stress resulting from the bending moment $M\alpha$ is not detected by the piezoelectric unit 2 located at the position Y, and thus the noise resulting from vibration of the duct is not detected. Therefore, the embodiment of FIGS. 9 (A), 9 (B) and 9 (C) offer excellent vibration resistance without detecting the noise that is based on the duct vibration. And great effect is ensured particularly in the measurement of such a fluid as air having a small vortex force in general.

In the double-support construction of this embodiment, there exist two points where the bending moment $M\alpha$ becomes zero. It is obvious, therefore, that the structure can be so modified as to dispose the piezoelectric unit 2 at a position Z in FIG. 9 (B). In case the vessel 1 is supported at one end while being fixed at the other end, there exists one point where the bending moment $M\alpha$ becomes zero as shown in FIG. 9 (C). And such a point is freely shiftable by changing the mass distribution of the vessel 1, so that the piezoelectric unit can be set at a position where the bending moment MV resulting from vortex generation is maximum.

Figure 10A:
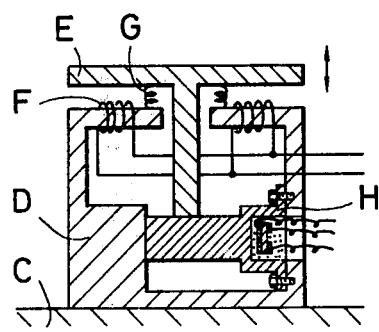
Figure 10B:
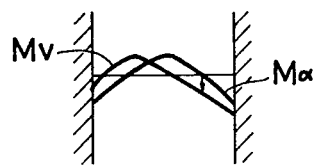

FIGS. 10 (A) and 10 (B) show an instance where the embodiment of FIGS. 9 (A), 9 (B) and 9 (C) is employed in a vibration tester, in which FIG. 10 (A) is a diagram of the structure, and FIG. 10 (B) schematically plots of bending moments. In the drawing: C is a base; D is a housing; E is a vibration testing table; F is a vibration exciting coil of the testing table E; G is a spring; and H is a pillar-shaped force detector of the present invention whose two ends are anchored to the housing D, and the middle portion is anchored to one end of the vibration testing table E. In this structure, a bending moment Mα caused by external vibration and a bending moment MV caused by the vibration testing table are such as shown in FIG. 3 (B). Therefore, the noise is not detected if the piezoelectric unit is disposed at a position where Mα becomes zero, so that the real vibration state of the testing table E can be indicated. And a real vibration test is rendered executable by feeding back the information representative of such vibration state. Consequently, it is advantageous in eliminating the necessity of a concrete base or a spring support for the entire tester which has been requisite heretofore to ensure isolation from external vibration.

Thus, the embodiments of FIGS. 9 (A), 9 (B) and 9 (C) and FIGS. 10 (A) and 10 (B) are capable of offering excellent vibration resistance without detecting the vibration noise transmitted from external sources.

As described hereinabove, the present invention is so constituted that a piezoelectric unit is sealed in a vessel in the manner to be integrated therewith by a seal member. As a result, the piezoelectric unit can be anchored in the vessel firmly by uniform strength, thereby effecting high-sensitivity transmission of an input force to the piezoelectric element at an enhanced efficiency as compared with any conventional device.

According to the present invention, therefore, it becomes possible to accomplish a compact, high-sensitivity force detector with stable characteristics.

We claim:

1. A force detector for detecting a force directly as a stress comprising:
    a columnar pressure receiving member;
    a container vessel secured to one end of the columnar pressure receiving member;
    a pair of piezoelectric elements in said vessel and positioned opposite to each other about the center axis of the pressure receiving member so that the piezoelectric elements receive differential stresses produced in the vessel by said pressure receiving member; and
    securing means comprising inelastic material engaging said piezoelectric elements for firmly securing and sealing said elements inside said vessel to provide that said elements are effectively integral with said vessel;
    said pair of piezoelectric elements serving to directly detect a force to be measured applied to said columnar pressure receiving member, and to convert said force into an electric output signal.

2. The force detector as defined in claim 1, wherein said securing means comprises a glass compound.

3. A force detector for detecting a force directly as a stress comprising:
    a columnar pressure receiving member;
    a container vessel secured to one end of the columnar pressure receiving member;
    a piezoelectric element in said vessel;
    securing means comprising inelastic material engaging said piezoelectric element for firmly securing and sealing said piezoelectric element inside the vessel to provide that said piezoelectric element is effectively integral with said vessel;
    said piezoelectric element being disposed in the vessel to be positioned so that the center axis of the piezoelectric element is in alignment with the center axis of the pressure receiving member; and
    said piezoelectric element comprising at least two sets of electrodes disposed symmetrically with respect to said center axis of the piezoelectric element and coupled to each other differentially.

* * * * *